(12) United States Patent
Jones et al.

(10) Patent No.: US 6,442,003 B1
(45) Date of Patent: Aug. 27, 2002

(54) ACTUATOR FOR DATA STORAGE DEVICE

(75) Inventors: David E. Jones, Layton; Ralph Sonderegger, Farmington, both of UT (US)

(73) Assignee: Iomega Corporation, UT (US)

( * ) Notice: Subject to any disclaimer, the term of this patent is extended or adjusted under 35 U.S.C. 154(b) by 0 days.

(21) Appl. No.: 08/727,128

(22) Filed: Oct. 8, 1996

Related U.S. Application Data

(63) Continuation of application No. 08/526,577, filed on Sep. 11, 1995, now abandoned, which is a continuation of application No. 08/324,599, filed on Oct. 18, 1994, now abandoned.

(51) Int. Cl.$^7$ ............................................... G11B 21/08
(52) U.S. Cl. ................................................... 360/266.7
(58) Field of Search .............................. 360/106, 99.01, 360/266.5, 266.7, 266.8, 266.9; 369/215, 219, 220, 244, 249

(56) References Cited

U.S. PATENT DOCUMENTS 5,012,372 A  *  4/1991  Isomura et al. .......... 360/266.5
5,267,111 A  *  11/1993  Nishimura et al. ...... 360/266.7

* cited by examiner

Primary Examiner—Allen Cao
(74) Attorney, Agent, or Firm—Woodcock Washburn LLP

(57) ABSTRACT

A linear actuator for a removable cartridge magnetic disk drive includes a center guide rail on which the actuator carriage travels. Bushings and the motor coil are spaced symmetrically with respect to the heads so that the center of mass, center of friction, center of force, and center of stiffness of the carriage are all aligned along the center rail. An outrigger travels on another rail to prevent rotation of the carriage.

6 Claims, 6 Drawing Sheets

ACTUATOR FOR DATA STORAGE DEVICE

This is a continuation, of application Ser. No. 08/526,577, filed Sep. 11, 1995 now abandoned which is a continuation of Ser. No. 08/324,599 filed Oct. 18, 1994 now abandoned.

RELATED APPLICATIONS

"Flexures Which Reduce Friction In An Actuator For Data Storage Device", Ser. No. 324,580 filed concurrently herewith, is incorporated herein by reference.

BACKGROUND OF THE INVENTION

This invention relates to a linear actuator for carrying read/write heads into engagement with a recording medium and more particularly, to a linear actuator with a carriage which is movable along a central guide track.

U.S. Pat. No. 4,740,851-Jones, et al and U.S. Pat. No. 4,663,677-Griffith, et al show removable media magnetic disk drives of the type made by the assignee of the present invention. A cartridge having a flexible recording medium is inserted into the disk drive. A motor rotates the disk which is engaged by magnetic read/write heads.

Rotary and linear actuators have been used to carry the magnetic heads into engagement with the disk. Linear actuators have been used for magnetic disk drives, CD players and optical recording drives. These actuators typically use a voice coil motor to move the carriage of the actuator. In the prior art, the main bearings and the coil are placed away from the line of travel of the heads. This frequently causes binding forces and resonance problems.

It is an object of the present invention to provide a lightweight, low mass, actuator which avoids the problems of the prior art.

SUMMARY OF THE INVENTION

In accordance with the present invention, a linear actuator has a lightweight carriage which is linearly movable along a central guide track. The carriage has bushings which travel along a cylindrical wire guide. The bushings and coil are spaced symmetrically with respect to the heads so that the center of mass, center of friction, center of force, and center of stiffness are all aligned along the central wire guide. This arrangement minimizes friction and mass and avoids binding forces and resonance problems.

The foregoing and other objects, features and advantages of the invention will be better understood from the following more detailed description and appended claims.

SHORT DESCRIPTION OF THE DRAWINGS

DESCRIPTION OF THE PREFERRED EMBODIMENT

Figure 1:
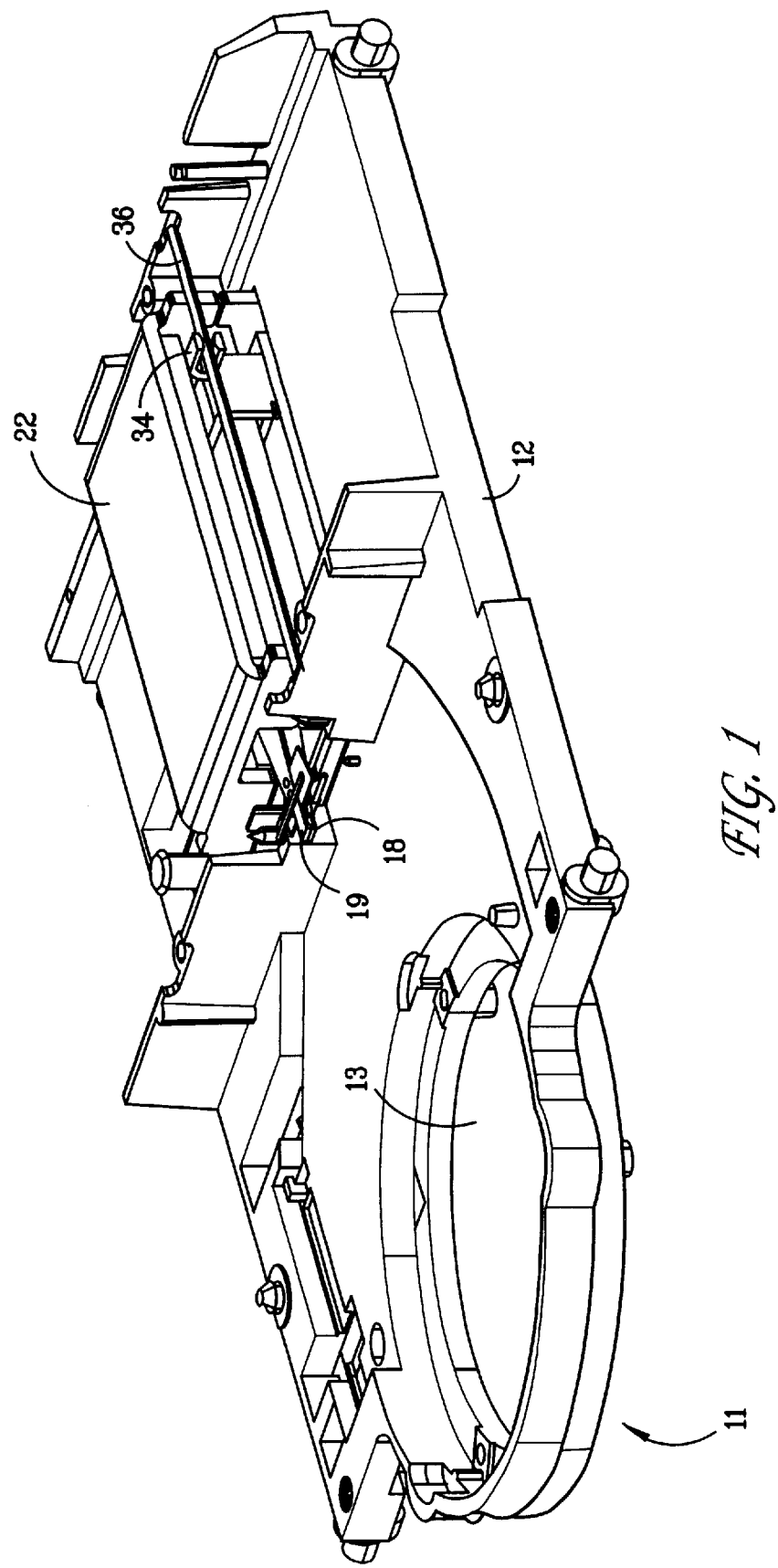
FIG. 1 shows the disk drive of the present invention with the cover removed.
Figure 1A:
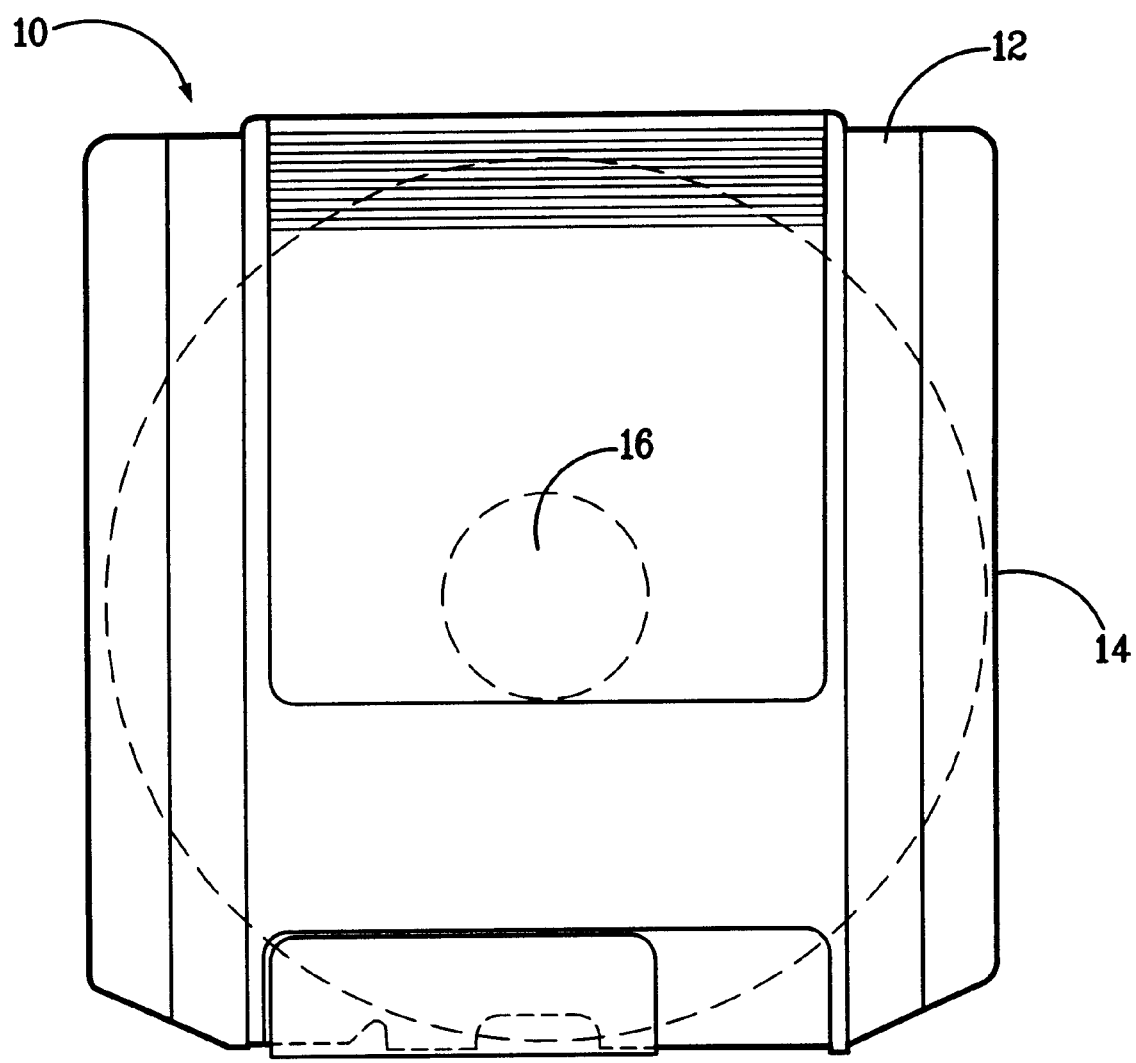
FIG. 1A shows a cartridge of the type used in such a disk drive.
Figure 2:
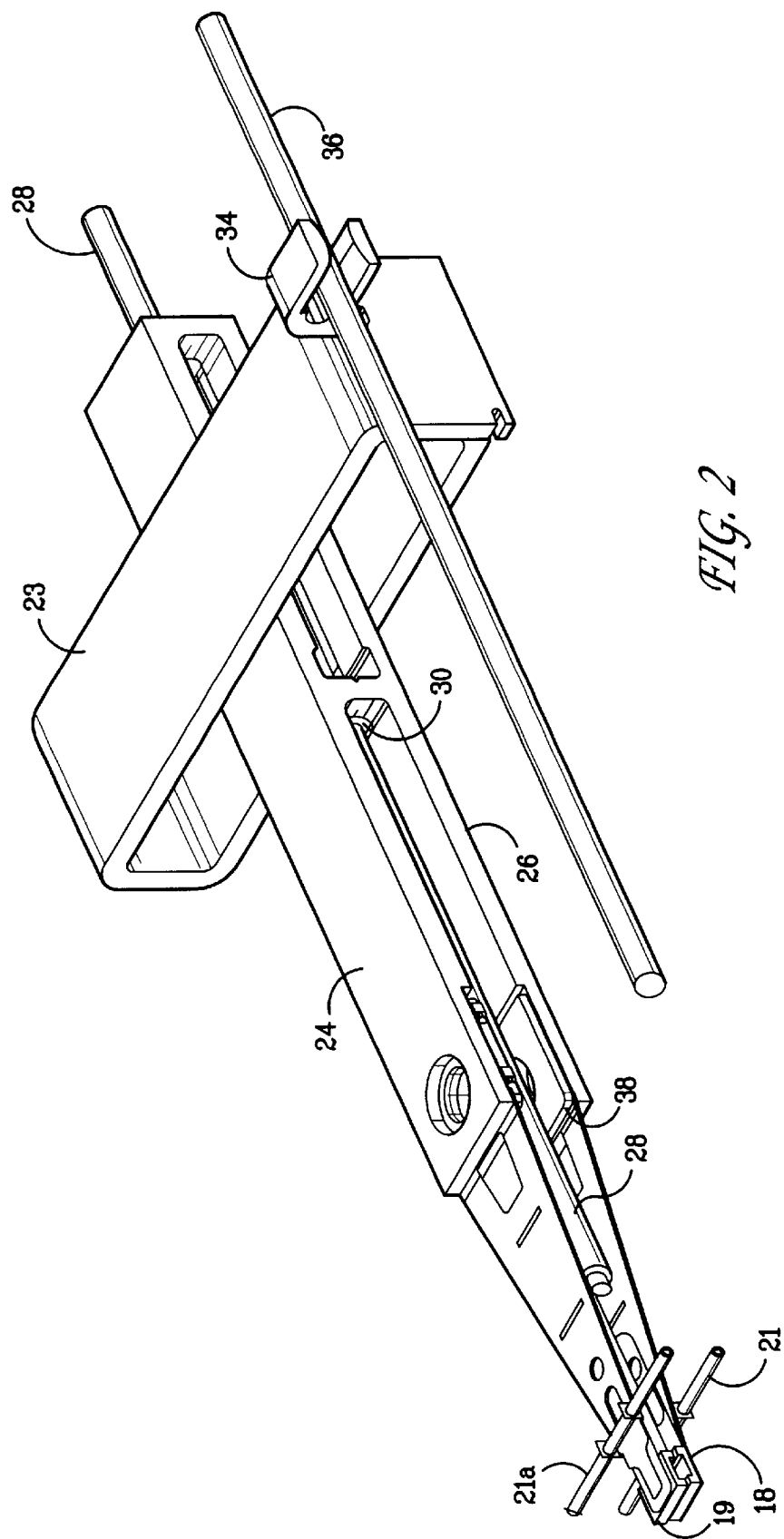
FIG. 2 shows the actuator of the present invention.

FIG. 1 shows a disk drive of the type in which a cartridge 10 (FIG. 1A) contains a recording media 14. The cartridge is inserted into the drive at 11. A motor which is mounted on the platform 12 at 13 rotates the flexible disk in the cartridge. The cartridge shown in FIG. 1A has a disk 14 with a hub 16 rotatably mounted therein to be rotated by the motor.

The disk is engaged by read/write heads 18 and 19 which are carried by the actuator of the present invention. Opposed heads 18 and 19 engage both sides of the disk. The heads 18 and 19 are mounted on standard Winchester hard disk drive suspensions which have been modified to include the lifting rods 21 and 21a.

Figure 3:
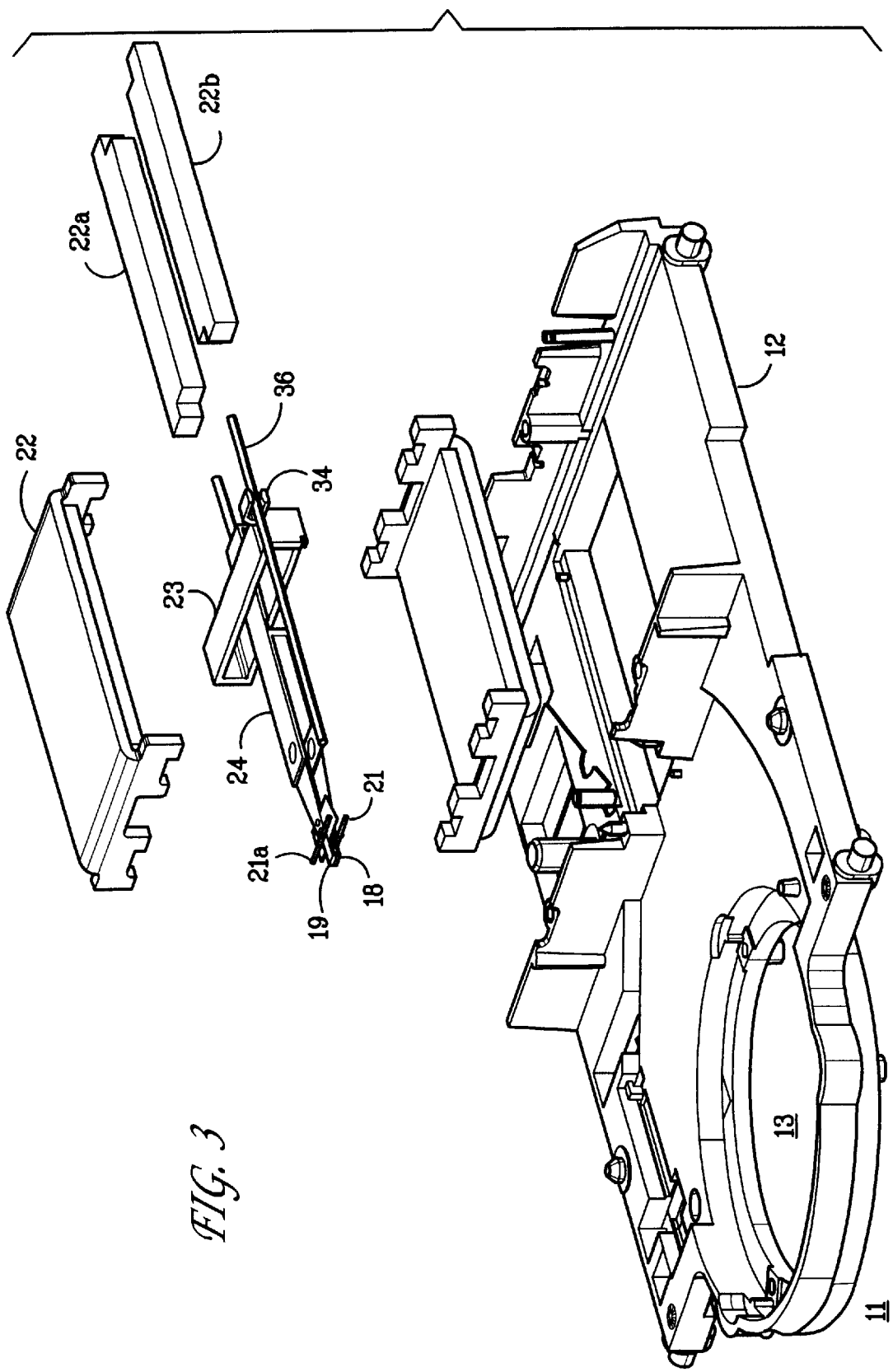
FIG. 3 is an exploded view of the actuator.

The voice coil motor for driving the carriage into and out of engagement of the heads with the recording medium includes an outer return path 22, and inner return path members 22a and 22b (FIG. 3). A voice coil 23 is mounted on the carriage assembly. The coil is bonded to the carriage assembly. When the coil 23 is energized, it interacts with the magnets to move the carriage linearly so that the heads 18 and 19 engage concentric tracks on the disk. The carriage includes two lightweight arms 24 and 26. The carriage travels on a central guide track 28 which is a cylindrical member, a small wire guide in the preferred embodiment.

The carriage has cylindrical bushings 30 and 32 through which the cylindrical guide track 28 passes. The guide track 28 aligns the heads 18 and 19 with the disk and the motor. Bushings 30 and 32 are sapphire jewel bearings in the preferred embodiment.

In accordance with the present invention, the coil 23 and the bushings 30, 32 are spaced symmetrically with respect to the heads 18 and 19. The center of mass of the carriage, the center of friction, the center of force, and the center of stiffness are all aligned along the center line of the guide track 28.

The center of stiffness is the axis about which the coil flexes symmetrically if the actuator is driven. It is the nodal line of the coil for the first in-plane resonant frequency, and an axis of symmetry for higher frequency modes. In accordance with the present invention, this flexing is lined up on the center line of the guide track 28. This is desirable because it makes a higher resonance structure than in previous designs. For example, in the flop-optical drive, which is commercially available, the forces are not lined up along the center line of a rail on which the carriage travels.

Figure 4:
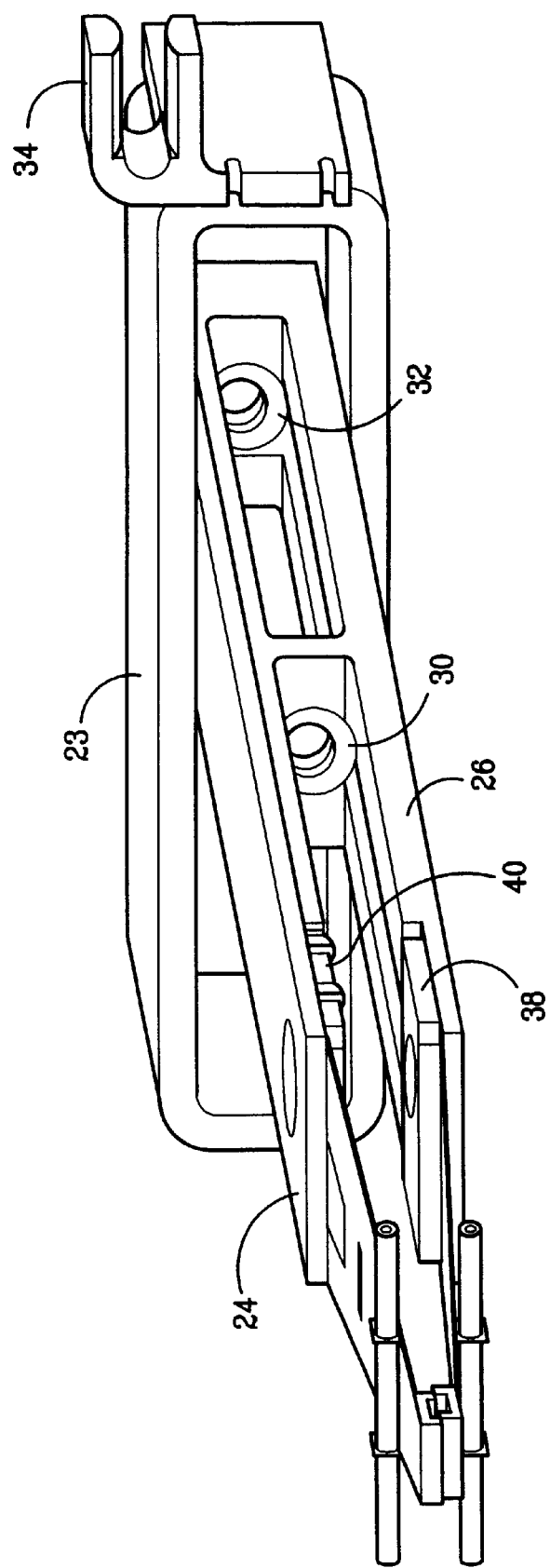
FIG. 4 is a close up view of the bushings in the carriage.
Figure 5:
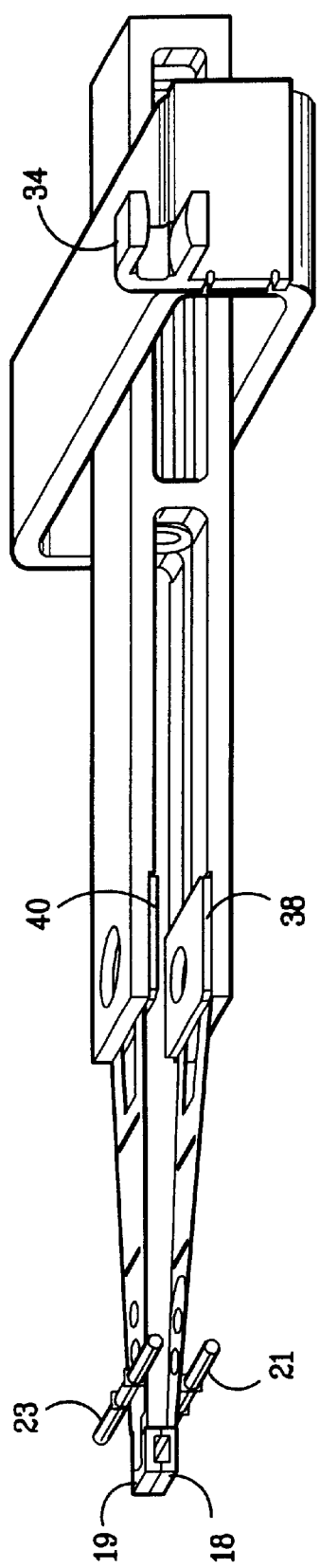
FIG. 5 is another view of the actuator.

The alignment and the central location of the bushings 30 and 32 between the two lightweight arms 24 and 26 provides a very light structure. The low mass makes the central location of the bearings possible since the low mass allows the small wire guide. The small wire guide is necessary because it must pass between the head mounting blocks 38 and 40 (FIG. 4).

An outrigger member 34 travels along a second track 36 to prevent rotation of the carriage. Both the guide 28 and the outrigger track 36 are precision wire guides.

While a particular embodiment of the invention has been shown and described, various modifications are within the true spirit and scope of the invention. The appended claims are, therefore, intended to cover all such modifications.

What is claimed is:

1. A disk drive having a linear actuator for carrying read/write heads into engagement with a recording medium comprising:

a carriage assembly, said heads being mounted on said carriage assembly, said carriage assembly having bushings;

a magnetic motor including a coil mounted on said carriage assembly for driving said carriage assembly into and out of engagement of said heads with said medium; and a cylindrical central guide track on which said carriage assembly is symmetrically mounted equally to the left, right, top and bottom of said guide track so that it slides linearly, along said guide track on said bushings as said coil is energized.

2. The drive recited in claim 1 wherein said track is a cylindrical member and said carriage assembly is mounted around said cylindrical member.

3. The drive recited in claim 1 wherein said bushings and said coil are spaced symmetrically with respect to said heads so that the center of mass, center of friction, center of force, and center of stiffness of said carriage assembly are all aligned on said central guide track.

4. The drive recited in claim 1 wherein said carriage assembly includes two lightweight arms, said bushings being between said arms, the center of mass of said carriage moving along the center line of said track.

5. The drive recited in claim 1 wherein said carriage assembly has an outrigger member, said outrigger traveling on a second track to prevent rotation of said carriage.

6. The drive recited in claim 3 wherein said cylindrical central guide track is a wire guide.

* * * * *